United States Patent [19]
Ricq et al.

[11] Patent Number: 5,929,624
[45] Date of Patent: *Jul. 27, 1999

[54] METHOD AND APPARATUS FOR DETECTING ELECTRIC CABLES

[75] Inventors: Sana Ricq, Meximieux; Dominique Egea, Lyon; Michel Autricque, Haubourdin, all of France

[73] Assignees: Electricite De France; AINF S.A., both of France

[*] Notice: This patent issued on a continued prosecution application filed under 37 CFR 1.53(d), and is subject to the twenty year patent term provisions of 35 U.S.C. 154(a)(2).

[21] Appl. No.: 08/407,585

[22] Filed: Mar. 20, 1995

[30] Foreign Application Priority Data

Mar. 23, 1994 [FR] France .................................. 94.03415

[51] Int. Cl.⁶ ...................................................... G01R 31/08
[52] U.S. Cl. .............................. 324/67; 324/529; 324/263
[58] Field of Search ................................ 324/713, 66, 67, 324/263, 326, 329, 337, 637, 532, 534, 642, 521, 522, 529, 536, 544, 541, 551, 543, 557, 531, 533

[56] References Cited

U.S. PATENT DOCUMENTS

| | | | |
|---|---|---|---|
| 3,893,025 | 7/1975 | Humphreys | 324/67 |
| 3,924,179 | 12/1975 | Dozier | 324/67 |
| 3,967,282 | 6/1976 | Young et al. | |
| 3,975,735 | 8/1976 | McCullough et al. | 324/326 |
| 3,991,363 | 11/1976 | Lathrop | 324/52 |
| 4,147,973 | 4/1979 | Weber | |
| 4,370,610 | 1/1983 | Allen et al. | |
| 4,884,034 | 11/1989 | Guzman | 324/529 |
| 4,906,938 | 3/1990 | Konopka | 324/529 |
| 5,001,430 | 3/1991 | Peterman et al. | |
| 5,043,666 | 8/1991 | Tavernetti et al. | 324/326 |
| 5,055,793 | 10/1991 | Mulcahey | 324/326 |
| 5,093,622 | 3/1992 | Balkman | 324/326 |
| 5,264,795 | 11/1993 | Rider | 324/326 |
| 5,471,143 | 11/1995 | Doany | 324/67 |

FOREIGN PATENT DOCUMENTS

| | | | |
|---|---|---|---|
| A-32 16 263 | 11/1983 | Germany | G01V 3/11 |
| A-37 08 968 | 10/1988 | Germany | G01V 3/11 |

*Primary Examiner*—Josie Ballato
*Assistant Examiner*—Jose M. Solis
*Attorney, Agent, or Firm*—Blakely Sokoloff; Taylor & Zafman

[57] ABSTRACT

A method of detecting the presence of an electric cable, the electric cable including conductive armoring and a conductive core that is electrically insulated from the armoring. In the method, the armoring is connected to ground, and a current pulse is emitted over the armoring by way of a current injector device connected to ground so that the return of the pulse to the injector device takes place via ground. The presence of the electric cable is detected in the proximity of a reception point by detecting, at the point, a signal that is representative of the pulse, by way of a detector.

8 Claims, 4 Drawing Sheets

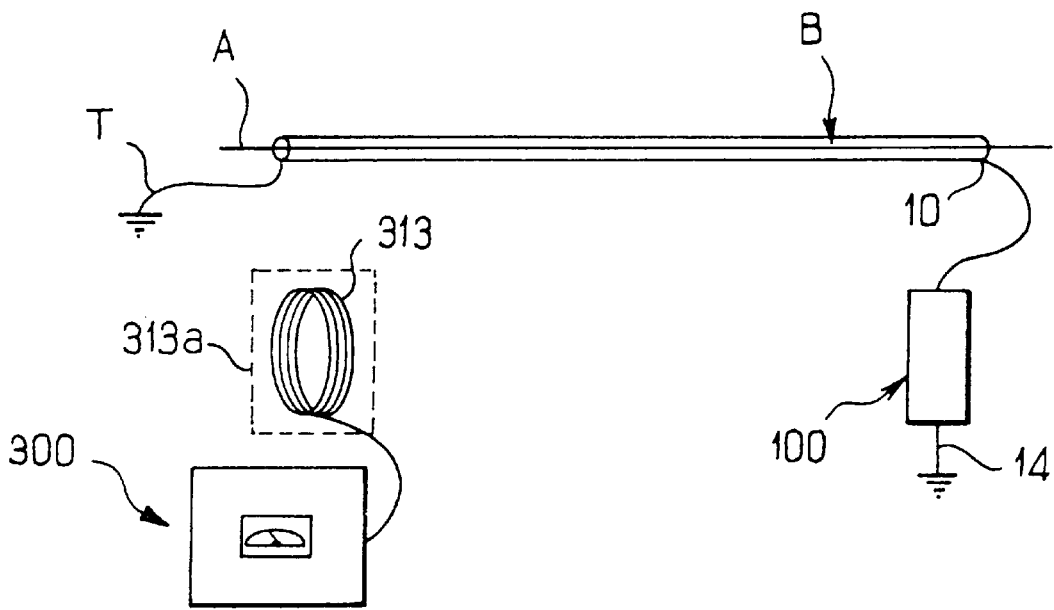
FIG_1
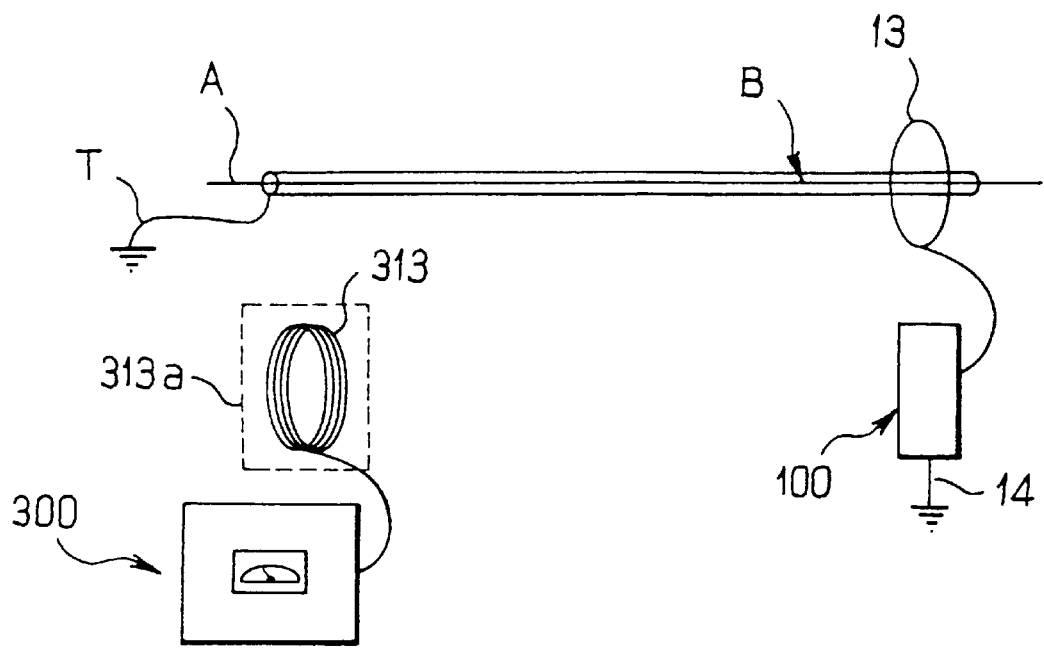
FIG_2

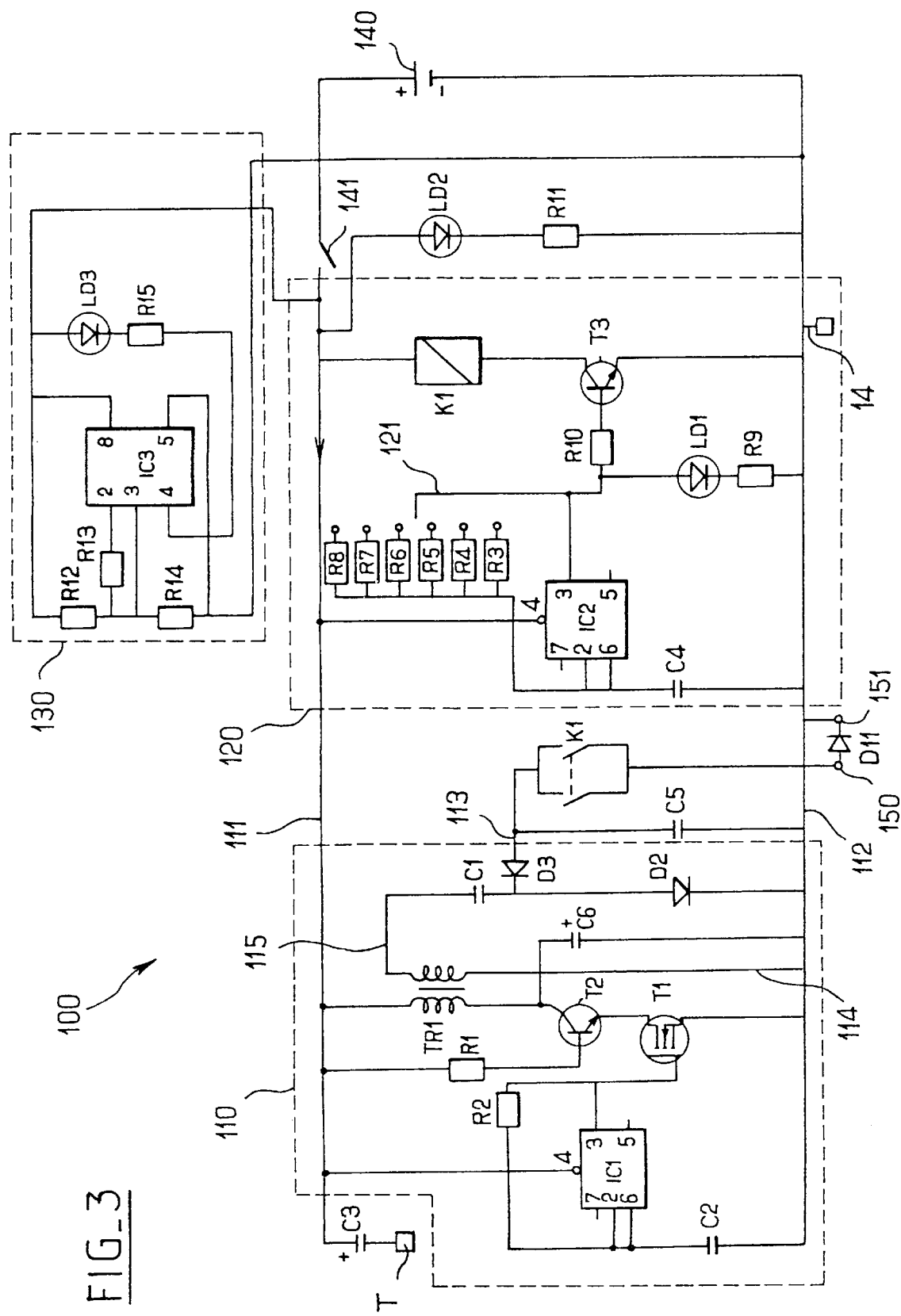
FIG_3

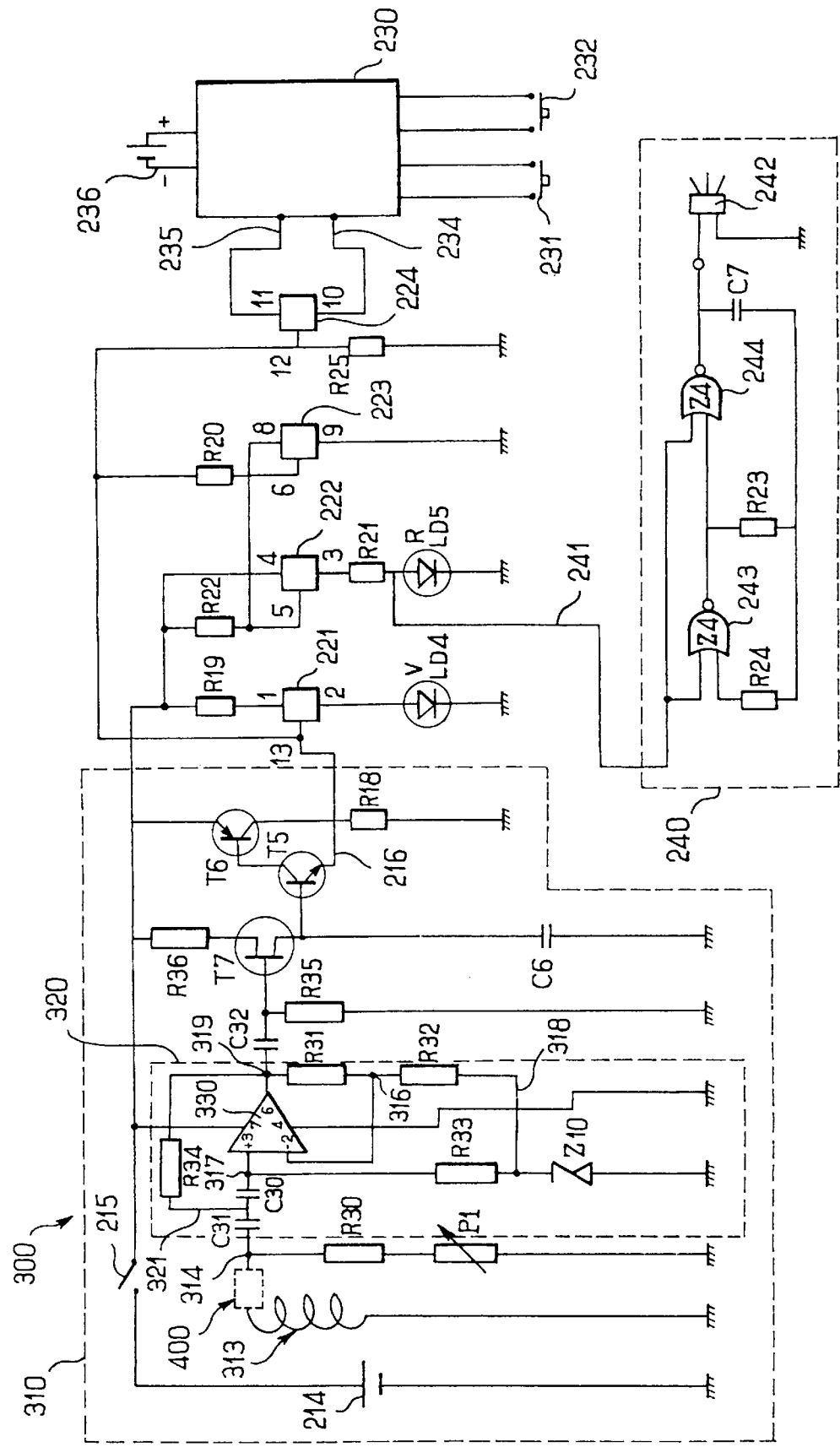
FIG_4

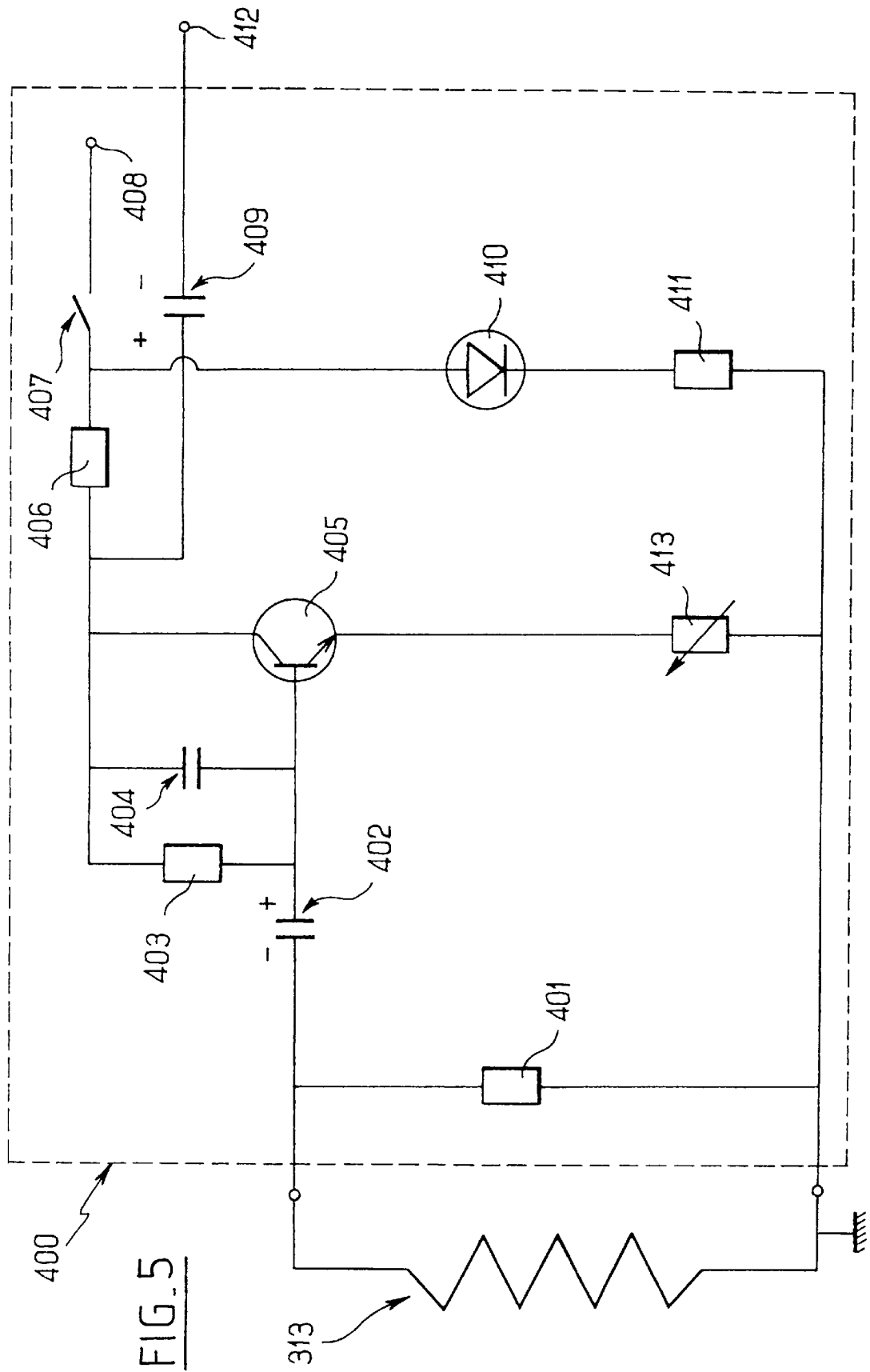
FIG_5

METHOD AND APPARATUS FOR DETECTING ELECTRIC CABLES

The present invention relates to a method and apparatus for detecting the presence of electric cables comprising conductive armoring and a conductive core that is insulated from the armoring.

When such electric cables are grouped together to form a bundle of cables extending over a long distance, it is no longer possible to follow individual cables in the bundle by eye, and one common technique for identifying a given cable at the ends of the bundle consists in connecting together the armoring and the core of said cable at one end of the bundle so as to form a conducting loop, and then from the other end of the bundle in detecting whether or not current flows between the armoring and the core of each cable under test. That technique requires electrical contact to be made with the core and the armoring of the cable at the detection location, and it prevents the cable being used during the time required for identification purposes. That drawback prevents the technique being used for identification purposes, particularly in nuclear power stations, when the cables concerned are important for safety and must not be disconnected, e.g. the cables connecting controlling equipment to sensors that measure parameters which are essential for the safety of the power station.

Such cables that are important for safety are also redundant. When they follow different paths, going through respective zones between which a fire is not likely to propagate, it is deemed unnecessary to protect one of the cables specifically against fire. In contrast, when all of the redundant cables are likely to be damaged by a fire in a single zone, then it is necessary to protect at least one of them against fire. The known technique described above for identifying cables cannot detect the presence of a given cable in such-and-such a premises, and consequently cannot determine which path is followed by the cable in order to decide whether or not it should be protected against fire.

An object of the present invention is to enable the presence or absence of a given cable to be detected remotely without disturbing the operation of the installations interconnected by that cable under the particular circumstances of the cable being in operation.

The present invention achieves the above objects by means of a method for detecting the presence of an electric cable that comprises conductive armoring and a conductive core that is electrically insulated from the armoring. In characteristic manner, said armoring is connected to ground, a current pulse is emitted over the armoring by means of a current injector device connected to ground so that the return for said pulse to said injector device takes place via ground, and the presence of the electric cable in the vicinity of a reception point is determined by detecting, by means of a detector, a signal representative of said pulse, at said point. In practice, the armoring of the cable is usually permanently connected to ground.

Other characteristics and advantages of the present invention appear on reading the following description of a non-limiting embodiment of the invention and on examining the accompanying drawings.

BRIEF DESCRIPTION OF THE DRAWINGS

FIGS. 1 and 2 show two variant implementations of the method of the invention for remotely detecting the presence of a given cable;

FIG. 3 is a circuit diagram of a current injection device in accordance with the present invention;

FIG. 4 is a diagram of a detector in accordance with the present invention for remotely detecting the presence of a cable; and FIG. 5 is a diagram of a preamplifier included in the detector shown in FIG. 4.

In FIGS. 1 and 2, A designates the conductive core of an electric cable, and B designates its armoring. In the embodiment shown in the figures, the cable is shown in part only, and the conductive core A is designed to convey information in electrical form while the armoring B serves to provide electromagnetic screening. In the present invention, the term "armoring" should be understood broadly and may designate equally well a spare electrical conductor of the cable that has no electromagnetic screening function. Similarly, the term "conductive core" should be understood broadly as designating any electrical conductor of the cable.

In accordance with the method of the invention: the armoring B is connected at some point to ground T; a current pulse is emitted over the armoring B by means of a current injector device 100 that is connected at 14 to ground, and a detector means 200 is used at a reception point situated close to the path of the pulse to detect a signal representative of said pulse.

A current pulse may be emitted by direct injection to the armoring B of the cable via an electrical contact at 10 between a conductive connected to the current injector device 100 and the armoring B, as shown in FIG. 1. Alternatively, current may be emitted without direct electrical contact but by induction, using a coil 13 connected to the injector device 100 and which is wound around the cable. Emission without direct contact makes it possible to induce a current that varies more slowly relative to time than can be done with direct injection, e.g. more slowly by a factor of 200. Advantageously, this can be made use of to avoid risks of disturbing electrical installations connected to the cable over which emission is taking place. The coil 13 is preferably made by means of a current-measuring clamp having two semicircular branches that are hinged together at one end and that are suitable for forming a turn when in the closed position. The clamp is installed on a cable by spreading the branches of the clamp apart.

A signal representative of the pulse is detected without making direct electrical contact with the armoring of the cable, with this being done by induction by means of a coil connected to the detector 300. In accordance with an advantageous characteristic of the invention, the maximum value of the current induced on the cable is limited to 25 A, and the duration of the pulse is less than 10 $\mu$s, and is preferably close to 5 $\mu$s, so as to avoid disturbing the operation of electrical installations connected to the core A of the cable.

It is possible to emit over a plurality of cables by means of injector devices 100 set to different rates and/or having opposite polarities, and to identify cables using a single detector 300 by measuring the time intervals between consecutive pairs of pulses on a given cable. Preferably, precautions are taken to ensure that said time interval between each successive pulse emission is greater than 1 second so as to avoid disturbing the operation of installations connected to the core A of the cable. According to another advantageous characteristic of the invention, said current pulse is emitted at a rate lying in the range 13 pulses per minute to 23 pulses per minute.

The current injector device 100, as shown diagrammatically in FIG. 3, comprises a voltage converter 110 powered at 111 and 112 by a low voltage from a DC source 140 which is constituted in the embodiment shown by a 6 V battery having a capacity of 2 Ah. The converter 110 delivers a high value rectified voltage at 113 (which voltage may be about 350 V), for the purpose of charging a capacitor C5 connected at 113 to the converter, and at 112 the negative terminal of the DC voltage source 140. In In the embodiment described, the capacitor C5 is not polarized, having capacitance of 1 μF and an installation voltage of 400 V. Naturally, a potentiometer could be connected in series with the resistor R1 to adjust the charging current applied to the capacitor and to adjust the quantity of no electricity that it stores.

The converter 110 includes an oscillator for feeding the primary of a transformer of a voltage raising circuit TR1 whose secondary winding is connected at 114 to the negative terminal of the source 140, and at 115 to a voltage doubler that includes a capacitor C1 and two diodes D2, D3 disposed in conventional manner. More particularly, the cathode of the diode D3 is connected to the capacitor C1, and the anode of the diode 3 corresponds to the output 113 of the converter 110. The anode of a diode D2 is connected to the cathode of the diode D3, and the cathode of the diode D2 is connected to the negative terminal of the voltage source 140. The capacitor C1 has one plate connected to the diodes D2 and D3 and has its other plate connected at 115 to the secondary of the transformer TR1.

The above-mentioned oscillator feeding the primary of the transformer TR1 includes a specialized integrated circuit IC1 of the type well known to the person skilled in the art merely under the reference "555". The pins 2 and 6 of the integrated circuit IC1 are connected together and to one of the plates of a capacitor C2 whose other plate is connected to the negative terminal of the source 140. The pin 4 of the integrated circuit IC1 is connected to the positive terminal of the source 140. The output 3 of the circuit IC1 is connected to the grid of a metal oxide silicon field-effect transistor (MOS-FET) T1 and via a resistor R2 to the pins 2 and 6. The MOS-FET T1 switches between the negative terminal of the source 140 and the emitter of an NPN type bipolar transistor T2 which acts as a current limiter, having its base connected via a resistor R1 to the positive terminal of the source 140. The collector of transistor T2 feeds the primary winding of the transformer TR1 which is also connected to the positive terminal of the source 140. A polarized capacitor is connected between the collector of T2 and the negative terminal of the source 140. By way of example, in the embodiment described, the components C1, C2, C6, R1, and R2 have the following values: C1=220 nF, C2=100 nF, C6=10 μF, R1=820 Ohms and R1=1 MOhms. The transistor T1 is of the type known under the reference "BS 170" and T2 is of the type known under the reference "BD 139".

An anti-interference capacitor C3 is connected between the positive terminal of the source 140 and ground T. The negative terminal of the source 140 is connected to ground T at 14.

In accordance with an advantageous characteristic of the present invention, the current pulse sent over the armoring of conductor B of the cable is generated by discharging the capacitor C5. To this end, the plates of capacitor C5 are connected respectively to two user terminals 150 and 151. Terminal 151 is connected to the negative terminal of the source 140 and thus the ground. Terminal 150 is connected via a relay K1 to the plate of capacitor C5 which is connected at 113 to the output of the converter 110. A diode D11 is connected between the terminals 150 and 151 to protect the contacts of the relay K1.

The relay K1 is caused to switch by a stepping circuit 120 designed to close the relay K1 at determined time intervals and thus to connect the terminal 150 to the plate of capacitor C5 which is connected at 113 to the converter 110.

The stepping circuit 120 comprises an a stable oscillator constituted in the embodiment described by a specialized integrated circuit IC2 of the same type as IC1. Pins 2 and 6 of integrated circuit IC2 are connected together and to a plate of a capacitor C4 whose other plate is connected to the negative terminal of the source 140. Pin 4 is connected to the positive terminal of the source 140. Output 3 of IC2 acts via a resistor R10 on the base of a transistor T3 acting as a switch to control the relay K1, and the output 3 is connected to pins 2 and 6 of IC2 via a selector 121 associated with an array of resistors R3, R4, R5, R6, R7, and R8 of different resistances. The user selects one of the resistors R3 to R8, thereby selecting the value of the resistance between the output 3 and the pins 2 and 6 of IC2, and thus selecting the rate at which the relay K1 is closed and the rate at which pulses are emitted over the armoring B of the cable. A light emitting diode (LED) LD1 connected in series with a resistor R9 between the output 3 of IC2 and the negative terminal of the source 140 informs the user whenever the relay K1 is passing current. By way of example, the resistors R3, R4, R5, R6, R7, and R8 have the following resistances in the embodiment described: R3=38 kohms, R4=82 kOhms, R5=120 kOhms, R6=180 kOhms, R7=220 kOhms, and R8=330 kohms. In the example described, the capacitance of C4 is 10 μF, the resistance of R10 is 6.8 kOhms, and T3 is of the type "2N2222".

Advantageously, as shown, an on/off switch 141 is connected in series with the positive terminal of the source 140. An LED LD2 is connected in series with a resistor R11 between the positive terminal o the source 140 and its negative terminal, downstream from the switch 141 for the purpose of informing the user whenever the current injection device 100 is switched on. When the source 140 is constituted by a battery, then the injector device advantageously further includes, as shown, a battery state indicator 130 implemented in conventional manner by means of a specialized integrator IC3 of the "8211" type, and of resistors R12, R13, R14, and R15, together with a LED LD3.

Depending on the mode of emission used, the terminal 150 is connected either directly to the cable or else to a current-measuring clamp, as described above.

FIGS. 4 and 5 show a detector 300 in accordance with the invention and used for remote detection of the presence of a cable, i.e. for detecting its presence within a radius of up to a few meters from a reception point.

The detector 300 uses a coil frame, which in the example described, has 10,000 turns of wire having a diameter of 0.1 mm. The diameter of the frame is 230 mm and its thickness is 15 mm. The coil frame 313 is advantageously mounted at the end of an angularly adjustable no telescopic support so as to be able to dispose the frame relative to the place through the cables pass in a position that maximizes its sensitivity. The coil frame 313 is also advantageously provided with electrical screening 313a constituted by an aluminum foil that is a few hundredths of a millimeter thick, covering both front faces of the frame and also its edge. In the embodiment described, the wire is wound on a support of plastics material between two plane endplates of plastics material each of which is about 1 mm thick. The above-mentioned aluminum foil is stuck to the external faces of the endplates and lies at a distance from the coiled wire that is selected in such a manner that the effects of echoes inside the aluminum screening are reduced to a minimum. The use of aluminum electrical screening that is permeable to the frequencies that are useful for detection purposes, i.e. frequencies of the order of about 100 kHz in the present example, but that acts as a screen to higher frequencies, makes it possible to detect a useful signal of very small amplitude, even one that is smaller in amplitude than the background noise.

FIG. 4 is a circuit diagram of the detector 300. This detector comprises an amplification stage 310 that includes an active filter 320 designed to filter out the noise due to mains, and a voltage amplifier constituted by a field effect transistor (FET) T7.

The coil frame 313 has one terminal connected to ground and has its other terminal connected via a preamplifier 400 to the input 314 of the active filter 320, and to a device for adjusting sensitivity which is constituted by a resistor R30 connected in series with a potentiometer P1 having one terminal connected to ground and that serves to adjust sensitivity. By way of indication, in the embodiment described, R30=2.7 kOhms and P1=100 kOhms. As shown in FIG. 8, the preamplifier 400 comprises a transistor 405 whose emitter is connected to ground via a potentiometer 413, whose collector is connected via a switch 407 in series with a resistor 406 to the positive power supply terminal, and whose base is connected via a polarized capacitor 402 to the coil frame 313. A resistor 401 is connected in parallel with the terminals of the coil frame 313. A resistor 403 and a non-polarized capacitor 404 are connected in parallel between the base and the collector of the transistor 405.

An LED 410 is connected in series with a resistor 411 between ground and the resistor 406 to indicate that the preamplifier 400 is switched on when the switch 407 is closed. The preamplified signal is taken via a polarized capacitor 409 from the collector 405 and is applied at 412 to the input 314 of the active filter 320. By way of indication, the transistor 405 is of the NPN type and is known under the reference BE 238 C. The resistance of resistor 401 is 100 kOhms, the resistance of resistor 403 is 1 Mohms, the resistance of resistor 406 is 10 kOhms, the resistance of resistor of 411 is 1 kohms, and the resistance of potentiometer 413 is 3.3 kOhms. The potentiometer is used for adjusting preamplification gain. The capacitor 402 has a capacitance of 10 $\mu$F, the capacitor 404 has a capacitance of 4.7 pF, and the capacitor 409 has a capacitance of 2.2 $\mu$F.

The active filter 320 includes an operational amplifier 330 of the type known under the reference TL 081, having an inverting input given reference 2 and connected to the common point 316 between two resistors R31 and R32, and having a non-inverting input connected to the common point 317 between a resistor R33 and a capacitor C30. The resistor R33 has its opposite terminal connected to the common point 317 between the cathode of a zener diode Z10 whose anode is connected to ground and at 318 to the terminal of resistor R32 opposite from the common point 316. The output of amplifier 330 is connected at 319 to the terminal of resistor R31 opposite from the common point 316, to the grid of FET T7 via a coupling capacitor C32, and via a resistor R34 to the terminal of capacitor C30 opposite from the common point 317. The common point 317 is connected via a capacitor C31 to the coil frame 313. The grid of FET T7 is connected via a bias resistor R35 to ground. The drain of FET T7 is connected via a resistor R36 to the positive terminal of the electrical power supply 214, and the source of FET T7 is directly connected to the base of transistor T5, and is connected via capacitor C6 to ground.

The transistor T6 which is of the PNP type has its emitter connected to the positive terminal of the source 214, has its base connected to the collector of NPN type transistor T5, and has its emitter connected via a resistor R18 to the negative terminal of the source 214. The amplified signal is delivered at 216 by the emitter of transistor T5. By way of indication, in the example described, the resistor R18 has the following resistance: 1 kOhms. T5 is of the type "BC 547".

The amplified signal delivered at 216 is applied to the pin 13 of a specialized integrated circuit of type "CD 4066". This circuit includes four switches given references 221, 222, 223, and 224 which are controlled for switching purposes by applying a positive voltage that is greater than a given threshold to respective pins 13, 5, 6, and 12 which are referred to as "switching" pins. The switch 221 receives via the pin 13 the signal delivered by the emitter of transistor T5, and when the voltage of this signal exceeds a given threshold, corresponding to detection of the pulse emitted by the current injector to the cable passing through the current-measuring clamp 213, it behaves like a closed-circuit switch between pins 1 and 2. Pin 1 is connected via a resistor R19 to the positive terminal of source 214, and pin 2 is connected to a green LED LD4 for telling the user that the pulse emitted by the current injector has been detected. Advantageously, when the LED LD4 lights up, a sound signal is simultaneously emitted, as described below.

The emitter of transistor T5 is connected via a resistor R20 to the switching pin 6 of switch 223. Pin 8 of switch 223 is connected to the switching pin 5 of switch 222, and pin 9 of switch 223 is connected to the negative terminal of the source 214 such that on detection of a signal that causes LED LD4 to light up, switch 223 behaves like a closed-circuit switch between pins 8 and 9, thereby connecting pin 5 of switch 222 to the negative terminal of the source 214. Switch 222 then behaves as an open-circuit switch between pins 3 and 4. Pin 4 of switch 222 is connected to the positive terminal of the source 214 and pin 3 of switch 222 is connected via a resistor R21 to the anode of a red LED LD5 whose cathode is connected to the negative terminal of the source 214. Because of the resistor R22 connecting pin 5 to the positive terminal of the source 214, in the absence of any detection of a signal representative of a pulse being applied to the armoring of the cable, and thus in the absence of the green LED LD4 lighting up, switch 222 behaves like a closed-circuit switch between pins 3 and 4, thereby causing red LED LD5 to light up. When a signal representative of the pulse applied to the cable is detected, then a positive voltage greater than a given threshold appears at 216 on pin 13 of the switch 212 and controls it so that it behaves like a closed-circuit switch between the pins 1 and 2. Further, this positive voltage delivered at 216 is applied via resistor R20 to pin 6 of switch 223. Switch 223 then behaves like a closed-circuit switch between pins 8 and 9, thus connecting switching pin 5 of switch 22 to the negative terminal of the source 214. Switch 222 then behaves like an open-circuit switch between pins 3 and 4, and the anode of LED LD5 is at practically the same potential as the negative terminal of the source 214.

An stable multivibrator 240 is connected at 241 to the anode of red LED LD5. This multivibrator 240 is connected to a piezoelectric device 242 for emitting a sound signal when the potential of the cathode of red LED LD5 is close to that of the negative terminal of the source 214. More particularly, the multivibrator 240 comprises two two-input NOR gates 243 and 244 each having a first input connected at 241 to the anode of LED LD5, the output of gate 243 being connected to the second input of gate 244, and the output of gate 244 being connected in series with the piezoelectric device 242 to the negative terminal of the source 214. A capacitor C7 is connected via one plate to the output of gate 244 and via its other plate and a resistor R24 to the output of gate 243 and to the second input of gate 243 via another resistor R24. In the absence of any detection of a signal representative of a pulse being applied to the armoring, LED LD5 lights up and the anode of said LED is at a potential which is high enough to prevent the multivibrator 240 operating, and thus to prevent the emission of a sound signal.

By way of indication, the resistors R19, R20, R21, R22, R23, and R24 in the embodiment described have the following resistances: R19=470 kOhms, R20=180 kOhms, R21=470 kOhms, R22=1 MOhms, R23=100 kOhms, and R24=180 kOhms. C7 has a capacitance of 1 nF.

The detector described includes means for measuring the time interval between the emission of two consecutive pulses. Thus, it is possible to emit simultaneously over a plurality of cables in a bundle by means of a plurality of current injector devices 100 as described above, each set to a different emission rate by means of its selector 121, and to use a single detector for measuring the time intervals between the emission of two consecutive pulses on the cable for the purpose of detecting its presence.

In the embodiment described, the means for measuring the time interval between the emission of two consecutive pulses are constituted by a conventional timer 230 powered at 236 by an electrical power supply and including a reset switch 232, a switch 231 for selecting the operating mode of the timer, and two inputs 235 and 234 for being connected together electrically to cause timing to start, timing being stopped by breaking the electrical contact between said inputs 234 and 235. These inputs are connected to respective pins 10 and 11 of the switch 224, its switching pin 12 being connected firstly at 216 to the emitter of transistor T5 and secondly via a resistor R25 to the negative terminal of the source 214. By way of indication, in the embodiment described, T7 is of the type known under the reference BF 245, R36 has a resistance of 27 Ohms, R35 has a resistance of 1 MOhms, R31 has a resistance of 32 kOhms, R32 has a resistance of 47 kOhms, C31 has a capacitance of 1 nF, C30 has a capacitance of 470 nF, R34 has a resistance of 10 kohms, and C32 has a capacitance of 10 nF.

The detector 300 is used during the injection of a pulse on a selected cable (which injection may be performed directly to one of the conductors as shown in FIG. 1, or indirectly by induction as shown in FIG. 2), by means of the device 100 which is used as described above. The coil frame 313 of the detector 300 is placed, for example, in premises in which it is desired to verify the presence of the cable.

The pulse emitted on the cable is picked up remotely by the coil frame 313, is then amplified, thereby causing LED LD4 to light up when the amplitude of the signal delivered by the coil frame 313 is sufficient, i.e. when the coil frame 313 is close enough to the armoring of the cable along which the electrical pulse emitted by the injection device 100 is propagating.

Finally, the invention makes it possible to follow the track of cables that are in service, since the pulse emitted over the armoring of the cable does not disturb the installations connected to the core of said cable, such that the method of the invention may advantageously be used for following the paths of cables that are important for the safety in a nuclear power station.

We claim:

1. A method of detecting the presence of an electric cable, the electric cable including armoring that is conductive and a conductive core that is electrically insulated from the armoring, the method comprising the steps of:

connecting the armoring to ground; and emitting a current pulse over the armoring by means of a current injector device connected to around so that the return for the pulse to the infector device takes place via ground, wherein the presence of the electric cable in the vicinity of a reception point is determined by detecting, at the point, a signal representative of the pulse, by means of a detector comprising a coil, wherein the coil is placed inside electrical screening constituted by aluminum foil.

2. The method of claim 1, wherein said current pulse is obtained by discharging a capacitor.

3. The method of claim 1, wherein said current pulse is emitted at a determined rate, and in that the detector includes means for measuring the time interval between the emission of two consecutive pulses.

4. The method of claim 3, wherein the time interval between the emission of each pulse is greater than 1 second.

5. The method of claim 1, wherein said emission takes place by direct injection to the armoring.

6. The method of claim 1, wherein said emission takes place by induction to said armoring.

7. The method of claim 1, wherein said pulse is detected by means of a coil.

8. Apparatus for detecting the presence of an electric cable, that is in service, said electric cable comprising conductive armoring and a conductive core that is electrically insulated from the armoring, wherein the apparatus includes a current injector device for emitting a current pulse over the armoring from an injection point, said current injector device being connected to ground such that the return for the current pulse to the injector device takes place via ground, and a detector for detecting at a reception point remote from the injection a signal representative of said pulse, wherein the detector includes a coil frame placed inside electrical screening constituted by aluminum foil.

* * * * *

UNITED STATES PATENT AND TRADEMARK OFFICE
CERTIFICATE OF CORRECTION

PATENT NO. : 5,929,624

DATED : July 27, 1999

INVENTOR(S) : Ricq et al.

It is certified that error appears in the above-identified patent and that said Letters Patent is hereby corrected as shown below:

In [56], line 23, delete "Blakely Sokolofit; Taylor" and insert -- Blakely, Sokoloff, Taylor --.

In column 3, line 4, delete "and at 112" and insert -- and at 112 to --.

In column 3, line 5, delete "In In the " and insert -- In the --.

In column 3, line 10, delete "of no electricity" and insert -- of electricity --.

In column 4, line 24, delete "kohms," and insert -- kOhms, --.

In column 4, line 52, delete "adjustable no telescopic" and insert -- adjustable telescopic --.

In column 5, line 37, delete "is 1 Mohms," and insert -- is 1 MOhms, --.

UNITED STATES PATENT AND TRADEMARK OFFICE
CERTIFICATE OF CORRECTION

PATENT NO. : 5,929,624
DATED : July 27, 1999
INVENTOR(S) : Ricq et al.

It is certified that error appears in the above-identified patent and that said Letters Patent is hereby corrected as shown below:

In column 5, line 39, delete "is 1 kohms," and insert -- is 1 kOhms, --.

In column 7, line 42, delete "kohms, and" and insert -- kOhms, and --.

In column 8, line 18, delete "connected to around" and insert -- connected to ground --.

In column 8, line 19, delete "to the infector" and insert -- to the injector --.

Signed and Sealed this

Tenth Day of April, 2001

Attest:

NICHOLAS P. GODICI

*Attesting Officer*    *Acting Director of the United States Patent and Trademark Office*